Oct. 27, 1953
J. A. CAVALLIER
2,656,857
COATED PIPE
Filed July 26, 1947
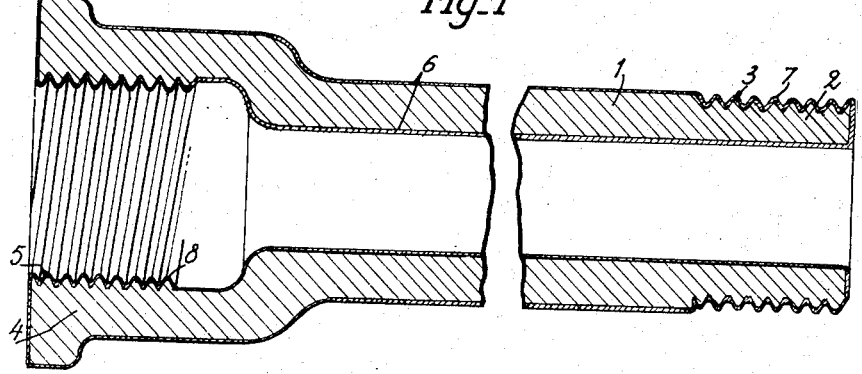
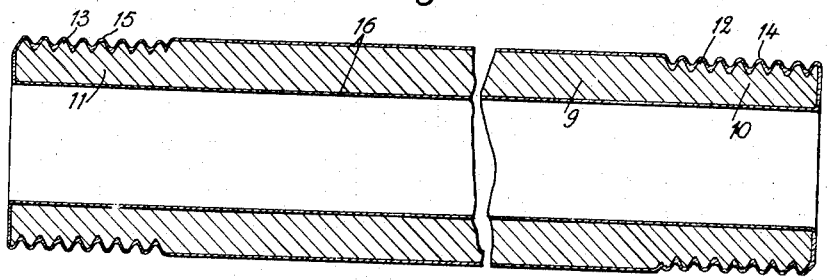
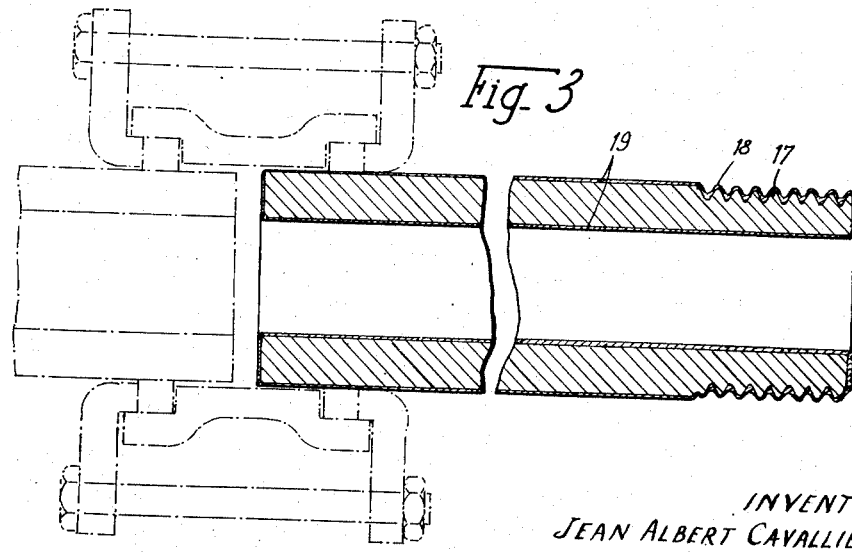
INVENTOR:
JEAN ALBERT CAVALLIER
By
Richardson, David and Norton
Attys Patented Oct. 27, 1953

2,656,857

UNITED STATES PATENT OFFICE 2,656,857

COATED PIPE

Jean Albert Cavallier, Nancy, France, assignor to Société: Pompes Noel, Liverdun (Meurthe-et-Moselle), France, a French company Application July 26, 1947, Serial No. 764,007
In France August 23, 1946

3 Claims. (Cl. 138—68)

It is known to use pipes with screwed joints, i. e. which are provided at their ends with screw-threaded portions enabling said pipes to be joined together by screwing, and the body of which is covered with a protecting coating. In such pipes:

On the one hand, the protecting coating has to be applied by hand, leaving the screw-threaded portions uncoated;

On the other hand, it is necessary to take precautions to prevent the oxidation of said screw-threaded portions before the joint is mounted and to coat them when this mounting is being effected with a special grease without which is would be more difficult to obtain fluid-tightness.

This involves a complication in the application of the coatings and requires the use of different coatings for the body and the screw-threaded portions of the pipe.

The present invention has for its object to provide a pipe with a screwed joint which is improved so as to overcome the aforesaid drawbacks. Said pipe is remarkable in particular in that the screw-threaded surface or surfaces are covered with a coating which is at the same time lubricating, sealing and protecting, said coating extending in the form of a protecting covering over the whole of the pipe.

The invention has further for its object to provide a method for applying said coating.

Other characteristics and advantages of the invention will become apparent from the ensuing description with reference to the accompanying drawing in which Figs. 1 to 3 show by way of example longitudinal diametral sections of pipes provided with coatings and coverings according to the invention.

Fig. 1 shows a pipe of the known type in which the body 1 ends in the form of a spigot 2 which is externally screw-threaded at 3 and of a bell 4 which is internally screw-threaded at 5. According to the invention the whole external and internal unthreaded surface of the pipe is covered with a plastic covering 6 which contains at least a solvent and which extends over the screw-threaded portions 3 and 5 in the form of lubricating, sealing and protecting coatings 7 and 8.

The thickness and the solvent content, i. e. the plasticity, of said covering 6 are smaller than that of said coatings 7 and 8.

Said covering and coatings may be obtained as follows.

According to a first method of application of the invention, the pipe after machining and threading is completely immersed in a bath of the following composition:

Coal tar pitch, about 60%
Anthracene oil, about 40% and the temperature of which is between 110° C. and 130° C.

The pipe is kept in this bath during the time required for heating it, or optionally for cooling it, until its temperature is equal to that of the bath. It is then taken out of said bath.

The screw-threaded end portions 3, 5 are then covered with coatings 7, 8 which extend over the whole remaining unthreaded surface of the pipe in the form of the protecting covering 6. The coatings 7, 8 have a substantially greater thickness than said covering 6 owing to the viscosity of the used composition and its capacity for filling the hollow parts of the threads.

A part of the anthracene oil then evaporates and this evaporation is proportionally greater on the unthreaded surface of the pipe than on the screw-threaded parts where it is made more difficult by the increased thickness of the coating. The cooling of the pipe gradually slows down and stops said evaporation so that the following compositions are finally obtained after drying—

On the thread:
Coal tar pitch, about 80%
Anthracene oil, about 20%

On the body of the pipe:
Coal tar pitch, about 90%
Anthracene oil, about 10%

According to a modification, the bath comprises a solution of bitumen in gas-oil; the composition of said bath is as follows:

Bitumen, about 60%
Gas-oil, about 40%

The immersion of the pipe is effected as hereinbefore at a temperature of 130° to 140° C. and the following compositions are finally obtained—

On the screw-threaded portions:
Bitumen, about 80%
Gas-oil, about 20%

On the body of the pipe:
Bitumen, about 90%
Gas-oil, about 10%

By means of the invention, the application of the protecting covering and coatings of the pipe is considerably facilitated, the pipes being immersed in a bunch without preparation and without its being necessary to take special precautions for the threads to remain bare.

Furthermore, the pipes are protected from oxidation on their internal and external surfaces, in particular on the screw-threaded portions, the preservation of which in good condition is essential for obtaining a satisfactory joint.

The applicant has observed that, owing to its plasticity being increased in the threads, the coatings 7, 8 according to the present invention in no way prevent the screwing of the pipes but, on the contrary, act as a lubricant. On the other hand, after screwing, they form a fluid-tight packing which further improves the behaviour of the joint.

According to another modification, the used composition comprises a solution of the following composition:

Coal tar pitch, about 60%
Benzole, about 40%

Said composition can be applied by immersion or by brushing or by atomization. It dries and hardens quickly in the cold state owing to the practically complete evaporation of the solvent. When the pipes are to be used, the coating is plasticized according to the invention, on the screw-threaded portions, by applying a little volatile or non-volatile solvent to said screw-threaded parts by means of a paint brush or in any other manner.

It is particularly advantageous, according to the invention, to use a thixotropic substance as a coating, i. e. a substance whose viscosity decreases proportionally to the pressure to which it is subjected. Tars and bitumens have this property which substantially facilitates the screwing of the pipes, since the screwing produces heavy pressures on the screw-threaded surfaces engaging one another.

Of course the invention is in no way limited to the solutions hereinbefore described which are given solely by way of examples.

Thus, the solution may comprise coal tar pitch or petroleum or bitumen, in solution in a single mineral, vegetable or even animal solvent; the solution may also consist of a more complex mixture containing one or more basic products and one or more solvents, which solvents may advantageously have different evaporation temperatures.

This solvent may be non-volatile and partly evaporate in the hot state so as to retain a certain plasticity on the screw-threads, or it may also be volatile and completely evaporate at ordinary temperature.

In all cases, the coatings 7, 8 and covering 6 can be applied by immersion as stated or again by brushing, by atomizing or by any other known means, the pipes to be coated being if necessary heated before the solution is applied, for example by stoving or by immersion in a hot bath.

In Fig. 2 the pipe 9 is provided with two end spigots 10, 11, the external surfaces of which are screw-threaded at 12, 13 and provided with coatings 14, 15 of greater thickness and plasticity than that of the covering 16 of the remaining external and internal unthreaded surface.

Fig. 3 is relative to a pipe in which one end only is externally screw-threaded at 17 and is covered with a coating 18, the thickness and plasticity of which are greater than that of the coating 19 which covers the remaining surface of the pipe.

The invention not only applies to straight pipes, but also of course to bent pipes, to joints and in a general manner to any piece of piping having screw-threaded portions.

Having now described our invention what we claim as new and desire to secure by Letters Patent is:

1. A pipe with at least one screw-threaded end portion which is covered with a lubricating, sealing and protecting plastic coating which contains at least a solvent having a high boiling point, the whole internal and external unthreaded surface of said pipe being covered with a thin protecting plastic covering and having the same constituents as the coating but, the thickness, solvent content and plasticity of said covering being smaller than that of said coating.

2. A pipe with at least one screw-threaded end portion which is covered with a lubricating, sealing and protecting plastic coating which has the following composition by weight, Coal tar pitch, about 80%
Anthracene oil, about 20% whilst the whole internal and external unthreaded surface of said pipe is covered with a thin plastic protecting covering, which has, on the one hand, a thickness and a plasticity which are smaller than that of said coating and, on the other hand, the following composition by weight, Coal tar pitch, about 90%
Anthracene oil, about 10%

3. A method for coating a pipe having at least one screw-threaded end portion which method consists in immersing the pipe in a bath of the following composition by weight: about 60% coal tar pitch and about 40% anthracene oil, maintaining said bath at a temperature between 110° and 130° C., keeping the pipe immersed in said bath until the temperature of the pipe is equal to that of the bath, removing the pipe from said bath, said pipe being completely covered with the coating composition, gradually cooling the pipe and its coating after removal from said bath, thus forming on the screw-threaded end portion of the pipe a lubricating, sealing and protective plastic coating which has the following composition by weight: about 80% coal tar pitch and about 20% anthracene oil, whereas the entire internal and external unthreaded surface of the pipe is covered with a plastic protective covering which is thinner than the coating at the screw-threaded portion and has the following composition by weight: about 90% coal tar pitch and about 10% anthracene oil.

JEAN ALBERT CAVALLIER.

References Cited in the file of this patent

UNITED STATES PATENTS

| Number | Name | Date |
| --- | --- | --- |
| 1,582,084 | Richter et al. | Apr. 27, 1926 |
| 2,047,772 | Eckert | July 14, 1936 |
| 2,084,209 | McIlroy | June 15, 1937 |
| 2,196,172 | Billings et al. | Apr. 9, 1940 |

FOREIGN PATENTS

| Number | Country | Date |
| --- | --- | --- |
| 367,387 | Great Britain | Feb. 15, 1932 |